(12) United States Patent
O'Connor et al.

(10) Patent No.: US 6,930,067 B2
(45) Date of Patent: Aug. 16, 2005

(54) PROCESS FOR THE PRODUCTION OF CATALYSTS WITH IMPROVED ACCESSIBILITY

(75) Inventors: Paul O'Connor, Hoevelaken (NL); Edwin Mark Berends, Almere-Stad (NL)

(73) Assignee: Akzo Nobel NV (NL)

( * ) Notice: Subject to any disclaimer, the term of this patent is extended or adjusted under 35 U.S.C. 154(b) by 60 days.

(21) Appl. No.: 10/161,865

(22) Filed: Jun. 4, 2002

(65) Prior Publication Data

US 2003/0027713 A1 Feb. 6, 2003

(30) Foreign Application Priority Data

Jun. 5, 2001 (EP) ............................................ 01202146

(51) Int. Cl.$^7$ ................................................ B01J 29/06
(52) U.S. Cl. .......................... 502/64; 502/60; 502/208; 502/214; 502/80; 502/84
(58) Field of Search ............................ 502/60, 64, 208, 502/214, 80, 84

(56) References Cited

U.S. PATENT DOCUMENTS

| | | | |
|---|---|---|---|
| 2,196,016 A | 4/1940 | Huenh et al. ................... 23/50 |
| 3,867,308 A * | 2/1975 | Elliott, Jr. ..................... 502/65 |
| 3,939,058 A | 2/1976 | Plank et al. ................. 208/120 |
| 3,972,835 A * | 8/1976 | Hoffman et al. ............... 502/65 |
| 4,126,579 A | 11/1978 | Flaherty, Jr. et al. ..... 252/455 Z |
| 4,176,090 A | 11/1979 | Vaughn et al. .......... 252/455 Z |
| 4,332,699 A * | 6/1982 | Nozemack .................... 502/68 |
| 4,458,023 A | 7/1984 | Welsh et al. .................. 502/65 |
| 4,537,866 A | 8/1985 | Gilson .......................... 502/70 |
| 4,547,487 A | 10/1985 | Vogel et al. ................ 502/351 |
| 4,613,585 A | 9/1986 | Takumi et al. .............. 502/355 |
| 4,843,052 A * | 6/1989 | Lussier ......................... 502/68 |
| 5,082,815 A | 1/1992 | Macedo ........................ 502/68 |
| 5,190,902 A * | 3/1993 | Demmel ....................... 502/63 |
| 5,366,948 A | 11/1994 | Absil et al. ................... 502/68 |
| 5,521,133 A * | 5/1996 | Koermer et al. ............... 502/9 |
| 6,613,710 B2 * | 9/2003 | Ray et al. ..................... 502/68 |

FOREIGN PATENT DOCUMENTS

| | | | |
|---|---|---|---|
| CA | 967136 | 5/1975 | ................... 252/60 |
| EP | 0 428 223 B1 | 5/1991 | ............ B01J/21/06 |
| GB | 1 315 553 | 5/1973 | ............ B01J/11/52 |
| WO | 96/09890 | 4/1996 | ............ B01J/29/04 |

OTHER PUBLICATIONS

Translation of Chinese Patent No.: 1247885A; published Mar. 22, 2000.
International Search Report for: EP 01 20 21746, dated: Oct. 19, 2001.
International Search Report of International Application No. PCT/EP02/05826, dated Nov. 07, 2002.
Written Opinion of International No. PCT/EP02/05826, dated Feb. 17, 2003.
International Preliminary Examination Report of International Application No. PCT/EP02/05826, dated Sep. 09, 2003.

* cited by examiner

*Primary Examiner*—Christina Johnson
(74) *Attorney, Agent, or Firm*—Louis A. Morris

(57) ABSTRACT

The present invention is directed to a process for preparing a catalyst which comprises combining catalyst components or precursors thereof in an aqueous medium to form a catalyst precursor mixture, feeding the mixture to a shaping apparatus, and shaping the mixture to form particles wherein just before the shaping step the mixture is destabilized. It was found that with this process catalysts can be prepared which have both a good attrition resistance and a high accessibility. The invention further relates to catalysts obtainable by this process.

23 Claims, 1 Drawing Sheet

PROCESS FOR THE PRODUCTION OF CATALYSTS WITH IMPROVED ACCESSIBILITY

CROSS REFERENCE TO RELATED APPLICATION

This application claims priority of European Patent Application Serial Number 01202146.5, filed Jun. 5, 2001.

BACKGROUND OF THE INVENTION

1. Field of the Invention

This invention relates to a process for preparing a catalyst which comprises combining catalyst components or precursors thereof in an aqueous medium to form a catalyst precursor mixture, feeding the mixture to a shaping apparatus, and shaping the mixture to form particles. The invention furthermore relates to catalysts obtainable by this process.

2. Prior Art

A common challenge in the design and production of heterogeneous catalysts is to find a good compromise between the effectiveness and/or accessibility of the active sites and the effectiveness of the immobilising matrix in giving the catalyst particles sufficient physical strength, i.e. attrition resistance.

The preparation of attrition resistant catalysts is disclosed in several prior art documents.

GB 1 315 553 discloses the preparation of an attrition resistant hydrocarbon conversion catalyst comprising a zeolite, a clay, and an alumina binder. The catalyst is prepared by first dry mixing the zeolite and the clay, followed by adding an alumina sol. The resulting mixture is then mixed to a plastic consistency, which requires about 20 minutes of mixing time. In order to form shaped particles, the plastic consistency is either pelletized or extruded, or it is mixed with water and subsequently spray-dried.

The alumina sol disclosed in this British patent specification comprises aluminium hydroxide and aluminium trichloride in a molar ratio of 4.5 to 7.0. This type of alumina sol will be referred to in the present specification as aluminium chlorohydrol.

U.S. Pat. No. 4,458,023 relates to a similar preparation procedure, which is followed by calcination of the spray-dried particles. During calcination, the aluminium chlorohydrol component is converted into an alumina binder.

WO 96/09890 discloses a process for the preparation of attrition resistant fluid catalytic cracking catalysts. This process involves the mixing of an aluminium sulphate/silica sol, a clay slurry, a zeolite slurry, and an alumina slurry, followed by spray-drying. During this process, an acid- or alkaline-stable surfactant is added to the silica sol, the clay slurry, the zeolite slurry, the alumina slurry and/or the spray-drying slurry to prevent gelling or polymerisation of the slurry ingredients before spray-drying.

CN 1247885 also relates to the preparation of a spray-dried cracking catalyst. This preparation uses an aluminous sol, a molecular sieve slurry, clay, and an inorganic acid. In this process the aluminous sol is added before the clay and the inorganic acid, and the molecular sieve slurry is added after the inorganic acid. It is disclosed that with this preparation process it is possible to change the interactions between the sol particles, thus causing a large fall in the viscosity of the slurry, which opens up the possibility of working with relatively high solids to liquid ratios.

As already mentioned above, heterogeneous catalysts preferably possess good attrition resistance and high accessibility. In general, as one would expect, the accessibility of the active phase will deteriorate with increasing amounts of binder material. So, the wish for good attrition resistance and high accessibility will usually require a compromise.

There is an ongoing need for catalysts which not only possess good attrition resistance but also a high accessibility of the active phase for the compounds to be converted. A process for the preparation of such catalysts is presented in the present specification.

SUMMARY OF THE INVENTION

In one embodiment, the present process comprises combining catalyst components or precursors thereof in an aqueous medium to form a catalyst precursor mixture, feeding the mixture to a shaping apparatus, and shaping the mixture to form particles. Just before the shaping step the mixture is destabilized.

In another embodiment, the invention comprises catalysts obtained by this process.

Other embodiments relate to precursor materials and reaction conditions all of which is described in detail hereinbelow.

DETAILED DESCRIPTION OF THE INVENTION

Figure 1:
FIGS. 1 and 2 are scanning electron microscopy photographs associated with examples 5 and 6.

More in particular, the process involves feeding suspended catalyst components or precursors thereof from one or more vessels (the "holding vessels") to a shaping apparatus via a so-called pre-reactor. In this pre-reactor the catalyst precursor mixture is destabilized.

In this specification a destabilized mixture is defined as a mixture which has a higher viscosity after leaving the pre-reactor (and before shaping) than before entering the pre-reactor. The viscosity increase is due to induced polymerisation or gelling of catalyst binder material in the pre-reactor. The viscosity is typically increased from a level of about 1–100 Pa·s at a shear rate of $0.1\ s^{-1}$ before entering the pre-reactor, to a level of about 50–1000 Pa·s or higher at a shear rate of $0.1\ s^{-1}$ after leaving the pre-reactor. In any case, it is preferred to induce a viscosity increase of at least 10 Pa·s, more preferably at least 50 Pa·s, and most preferably at least 100 Pa·s (measured at a shear rate of $0.1\ s^{-1}$). Preferably, the viscosity is increased from a level of about 1–50 Pa.s at a shear rate of $0.1\ s^{-1}$ before entering the pre-reactor, to a level of about 50–500 Pa·s at a shear rate of $0.1\ s^{-1}$ after leaving the pre-reactor. The viscosity can be measured by standard rheometers, such as plate-and-plate rheometers, cone-and-plate rheometers or bop-and-cup rheometers.

If desired, the viscosity inside the pre-reactor may be controlled to manageable levels by using high-shear mixing or ultrasound treatment. The pre-reactor can also have the form of a slurry mill or grinder.

The pre-reactor preferably has a controlled residence time. The residence time can vary depending on the exact configuration of the pre-reactor, but typically ranges from about 1 to 180 seconds, and preferably from about 30 to 90 seconds.

Destabilization of the catalyst precursor mixture is performed in the pre-reactor just before the shaping step. The time period involved and what is meant by "just", i.e. the time which elapses between the start of the destabilization and the shaping, depends on the exact configuration of the pre-reactor and on the time needed thereafter for the destabilized mixture to reach the shaping apparatus. Time periods of up to half an hour are possible, but may be less preferred for economical reasons. Preferred is a time period of less than about 300 seconds. A more preferred time period is less than about 180 seconds.

The catalyst precursor mixture can be destabilized for instance by temperature increase, pH increase or pH decrease and addition of gel-inducing agents such as salts, phosphates, sulphates, (partially) gelled silica (See: C. J. Brinker, G. W. Scherer, *Sol Gel Science,* Academic Press. 1990). The pH can be changed by the addition of a pH regulating agent (acids and/or bases, such as $HNO_3$, HCl, NaOH, $NH_4OH$, etc.)

Catalyst components or precursors thereof can be fed to the pre-reactor from one or more holding vessels.

Suitable catalyst components include zeolites (e.g. Y-zeolites, including H-Y-zeolites and USY-zeolites, zeolite beta, MCM-22, and MCM-36, ZSM-5, as described in *Atlas Of Zeolite Structure Types,* W. M. Meier and D. H. Olson, 3rd revised edition (1992), Butterworth-Heinemann, clays (e.g. kaolin, treated kaolin, bentonites, (doped) anionic clays such as hydrotalcite and doped hydrotalcite, smectites), alumina ($Al_2O_3$, aluminium trihydrate and its thermally treated forms, boehmite), and binder materials (e.g. silica sol, water glass, peptised alumina, aluminium chlorohydrol or mixtures thereof). In one embodiment of this invention all or a portion of the binder material precursor can be fed to the pre-reactor as pH regulating agent. Especially phosphate-activated zeolites, (doped) anionic clays such as hydrotalcite and doped hydrotalcite are suitable pH regulating agents.

Aluminium chlorohydrol typically possesses the formula $Al_{2+m}(OH)_{3m}Cl_6$, wherein m has a value of about 4 to 12. Aluminium chlorohydrol solutions are also frequently referred to in the art as polymeric cationic hydroxy aluminium complexes or aluminium chlorohydroxides, which are polymers formed from a monomeric precursor having the general formula $Al_2(OH)_5Cl \cdot 2H_2O$. The preparation of an aluminium chlorohydrol solution is typically disclosed in U.S. Pat. No. 2,196,016, CA 967,136, and U.S. Pat. No. 4,176,090. Typically, the preparation of aluminium chlorohydrol involves reacting aluminium metal and hydrochloric acid in amounts which will produce a composition having the formula indicated above. Furthermore, the aluminium chlorohydrol can be obtained using various sources of aluminium such as alumina ($Al_2O_3$), boehmite or aluminium trihydrate or its thermally treated form, (treated) clay and/or mixtures of alumina and/or clay with aluminium metal. Preferably, the aqueous aluminium chlorohydrol solutions used in the practice of the present invention will have a solids content ranging from about 15 to 50 percent by weight $Al_2O_3$, preferably 20–40 percent by weight. Also aluminium chlorohydrate-containing compositions can be fed to the pre-reactor as a binder material. Such a composition can suitably be prepared by reaction of aluminium trihydrate, its thermally treated form or boehmite with HCl. Analogously, nitric based alumina sols can be prepared by reaction of the above-mentioned alumina sources and nitric acid.

As said above, the catalyst precursor mixture can be destabilized either by a temperature change or by a change in pH. The desired pH or temperature will depend on the gelling or polymerisation properties of the binder used and the rest of the catalyst composition. This pH generally ranges from about 1 to 6.5. The desired temperature generally ranges from about 15° to 35° C. and typically is ambient. Aluminium chlorohydrol-containing mixtures will typically be destabilized by increasing the temperature to about 40°–99° C. or by changing the initial pH of the mixture from about 4.0 to below about 3.5 or from about 4.0 to higher than about 4.5, preferably to between 4.5–6.0; Silica sol, water glass, and peptised alumina-containing mixtures are typically destabilized by increasing the temperature to about 40°–99° C. Water glass and/or silica sol-containing mixtures can also be destabilized by increasing the initial pH, which is in the range of 1 to 5 and typically between 2.5 and 3.5, to a destabilization pH in the range of 3–10, typically between 4 and 6. As mentioned above, the silica sol can be sodium-free or not. Peptised alumina-containing mixtures can also be destabilized by increasing the initial pH, which is in the range of 3 to 5, to a destabilization pH of 4 or higher. It should be noted that the initial pH and the destabilization pH of the mixture depend on the total composition of the mixture and, therefore, the optimal pH for destabilization should be determined for specific mixtures.

The optimal pH for destabilization can easily be determined by preparing a catalyst composition consisting of the various components, using an acid such as HCl or $HNO_3$ to vary the pH, and establishing the viscosity after a certain time as a function of the pH. The same can be done using a base such as $NH_4OH$ to vary the pH. It is important to verify that prior to destabilization, peptisable compounds if present are well peptised. This will result in the best combination of accessibility and catalyst strength after destabilization. Temperatures are measured by thermocouples. The pH of the mixtures is measured by the usual pH probes.

The temperature of the pre-reactor is typically controlled by external heating means, whereas the pH is controlled by adding a pH regulating agent. This agent can be either acidic or basic, depending on the pH of the catalyst precursor mixture. Thus, destabilization can be promoted by the addition of an acid or base stream.

Suitable pH regulating agents include slurries or solutions of sodium hydroxide, ammonium hydroxide, nitric acid, sodium aluminate, magnesium oxide, sodium silicate, silica sol, sodium-free silica, sodium phosphate, ammonium phosphate, and diammonium phosphate. The pH regulating agents mentioned above also have a viscosity reducing effect. The use of said pH regulating agents also allows working with high solid slurries with a solids content between about 35 and 55 wt %. Further, it is possible to first use a pH regulating agent to reduce the viscosity and subsequently use another pH regulating agent for destabilization. Which agents will be used depends on the application of the resulting catalyst.

For instance, when using sodium aluminate, interaction of the aluminium ions with the silica present in the catalyst will introduce additional acid sites, whereas the addition of sodium silicate can promote silica sol formation, which can provide extra binding properties. Silica sol as such, for example in its ammonium stabilized form, is also a very suitable pH regulating agent. As mentionedabove also phosphate-activated zeolites, anionic clays such as hydrotalcite and doped hydrotalcite can suitably be used as pH regulating agents.

It is also possible to peptise the components in the catalyst precursor mixture with acid, e.g. nitric acid, formic acid, etc., followed by destabilising the mixture with a base, e.g. ammonium hydroxide. This peptisation can be performed in the pre-reactor or in a vessel placed in advance of the pre-reactor. Such a vessel can have the form of a holding vessel or a pre-reactor.

Additionally, it is possible to add a base, e.g. ammonium hydroxide, to the precursor mixture, after which acid, e.g. nitric acid, is used to destabilize the mixture.

Magnesium oxide, or MgO-containing components such as hydrotalcite, can in addition introduce vanadium passivation capacity and SOx reduction capabilities into the catalyst, while phosphates (for instance sodium phosphate, ammonium phosphate and/or phosphoric acid) in addition promote passivation of the zeolite non-famework alumina or of other amorphous alumina species in the catalyst.

Phosphates can also be added to activate and/or stabilize the zeolites, for instance in the case of phosphate-activated ZSM-5. Also, a pre-treated stream of these phosphate-activated zeolites can be added to this pre-reactor to simultaneously function as a pH regulating agent, thus avoiding the loss of activation which might occur if the pH is not adjusted.

Additives can be added to the catalyst precursor mixture in the pre-reactor or to the pH regulating agent. Suitable additives comprise compounds of rare earth metals (for example Ce, La), Si, P, B, Group VI, Group VIII, alkaline earth (for instance Ca, Mg or Ba) and/or transition metals (for example W, V, Mn, Fe, Ti, Zr, Cu, Ni, Zn, Mo, Sn). Suitable sources of these compounds are oxides, hydroxides, acetates, oxalates, carbonates, nitrates, and halides. Preferred additives are rare earth metals, magnesium compounds, alumina, $Na_3PO_4$, and $(NH_4)_3PO_4$.

After destabilization the catalyst is shaped. Suitable shaping methods include spray-drying, pelletizing, extrusion (optionally combined with kneading), beading, or any other conventional shaping method used in the catalyst and absorbent fields or combinations thereof. A preferred shaping method is spray-drying. If the catalyst is shaped by spray-drying, the inlet temperature of the spray-dryer ranges from about 300 to 600° C. and the outlet temperature ranges from about 105 to 200° C.

The process of the present invention can be used for the preparation of various catalysts and catalyst additives, such as fluid catalytic cracking catalysts, fluid catalytic cracking additives, such as SOx reduction, NOx reduction, CO combustion additives, ZSM-5 additives, sulphur in gasoline reduction additives, hydroprocessing catalysts, alkylation catalysts, reforming catalysts, gas-to-liquid conversion catalysts, coal conversion catalysts, hydrogen manufacturing catalysts, and automotive catalysts.

FIG. 1 presents a scanning electron microscopy photograph of the catalyst prepared according to Comparative Example 5. This catalyst was prepared without destabilization of the mixture just before shaping.

Figure 2:
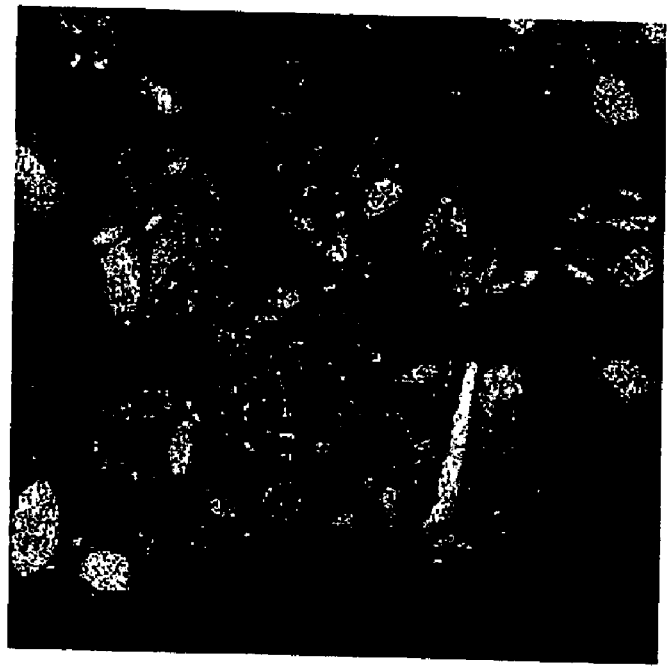

FIG. 2 presents a scanning electron microscopy photograph of the catalyst prepared according to Example 6. This catalyst was prepared according to the process of the invention, i.e. with stabilisation of the mixture just before shaping.

The invention is illustrated by the following examples.

EXAMPLES

The accessibility of the catalysts prepared according to the Examples below was measured by adding 1 g of the catalyst to a stirred vessel containing 50 g of a 15 g/l Kuwait vacuum gas oil (KVGO) in toluene solution. The solution was circulated between the vessel and a spectrophotometer, in which process the KVGO-concentration was continuously measured.

The accessibility of the catalysts to KVGO was quantified by the Akzo Accessibility Index (AAI). The relative concentration of KVGO in the solution was plotted against the square root of time. The AAI is defined as the initial slope of this graph:

$$AAI = -d(C_t/C_0)/d(t^{1/2})*100\%$$

In this equation, t is the time (in minutes) and $C_0$ and $C_t$ denote the concentrations of high-molecular weight compound in the solvent at the start of the experiment and at time t, respectively.

The attrition resistance of the catalysts was measured by both a standard Attrition Test and the so-called Hot Attrition Test. Both these tests are based on the usual air jet apparatus as pioneered by Forsythe and Hertwig (*Ind. Eng. Chem.*, Vol. 41, 1977, pp. 1200–1206).

The Hot AttritionTest is carried out at high temperatures (700° C.) in order for it to be realistic for gauging fines generation in FCC regenerators.

In this test the catalyst bed resides on an attrition plate with three nozzles. The attrition plate is situated within an attrition tube which is heated at 700° C. by way of radiating heat. Air is forced to the nozzles and the resulting jets bring about upward transport of catalyst particles and generated fines. On top of the attrition tube is a separation chamber where the flow dissipates, and most particles larger than about 16 microns fall back into the attrition tube. Smaller particles are collected in a collection bag.

The Hot Attrition Index (HAT) is reported as the weight percentage of fines collected in the collection bag after 24 hours, based on an imaginaryintake of 50 grams. So, more attrition resistant catalysts will result in lower HAT values.

The standard Attrition Test is comparable to the Hot Attrition Test, except for the temperature, which is ambient in the standard test. After calcination of the samples at 600° C., the test is first run for 5 hours to measure the initial (0–5 hours) attrition and then for another 15 hours to get the inherent (5–20 hours) attrition. The Attrition Index (AI) is the extrapolated % attrition after 25 hours.

It is our experience that the Hot Attrition Test proved a better measure of the simulation of industrial FCC attrition and hence a better indicator of commercial catalyst losses and emissions than the standard attrition test

Comparative Example 1

A catalyst precursor mixture with a total solids content of 25% comprising, on dry base, 30 wt % RE-USY, 10 wt % boehmite alumina (Condea Pural 200®), 10 wt % aluminium chlorohydrol, and 50 wt % kaolin was prepared by adding water to the holding vessel, followed by zeolite, boehmite, aluminium chlorohydrol, and kaolin.

The slurry was fed to a pre-reactor with a volume of 1 liter with a residence time of 25 seconds. The slurry was homogenised in the pre-reactor by way of high-shear mixing using an EKATO-INTERMIG®) impeller at 1,800 rpm. Spray-drying was performed with an inlet temperature of 400° C. and an outlet temperature of 120° C. The pH of the catalyst precursor mixture was 4.3; the temperature was 25° C.; and the viscosity was 5 Pa·s at a shear rate of 0.1 $s^{-1}$. The viscosity was measured using a Physica®) UDS rheometer with a cone-and-plate configuration. In this Comparative Example the mixture was not destabilized before spray-drying.

The Akzo Accessibility Index (AAI) of this comparative catalyst A was 8.5. The Attrition Index (AI) of this catalyst was 10.2; the Hot Attrition Index (HAT) was 8.5.

Example 2

Catalysts B–F were prepared in the same way as comparative catalyst A of Comparative Example 1, the difference being that 1 minute before spray-drying the mixture was destabilized by the continuous addition (residence time: 25 seconds) of a 10 wt % HCl solution (Catalysts B and C), a 10 wt % NaOH solution (Catalysts D and E) or a 10 wt % $NH_4OH$ solution (Catalyst F) to the pre-reactor. After destabilization the viscosity had increased to 75 Pa·s at a shear rate of $0.1\ s^{-1}$.

The pH of the mixtures after this destabilization is presented in Table 1, together with the resulting Akzo Accessibility Index (AAI) and the Hot Attrition Index (HAT).

TABLE 1

| Catalyst | Comparative catalyst A | B | C | D | E | F |
| --- | --- | --- | --- | --- | --- | --- |
| Acid/base | — | HCl | HCl | NaOH | NaOH | $NH_4OH$ |
| Final pH | 4.3 | 3.0 | 2.0 | 5.2 | 6.1 | 5.6 |
| AAI | 8.5 | 8.8 | 9.3 | 8.9 | 9.2 | 9.7 |
| HAT | 8.5 |  | 6.5 |  | 9.8 | 12.4 |
| AI | 10.2 | 7.5 | 10.1 | 9.8 | 20.4 | 20.2 |

These results show that with the method according to the invention, catalysts with improved accessibility were obtained as compared to catalysts obtained under like conditions without destabilization. Moreover, the invention offers a way to prepare catalysts which possess both higher accessibility and better attrition resistance compared to conventionally prepared catalysts.

Comparative Example 3

A catalyst precursor mixture with a total solids content of 30% comprising, on dry base, 35 wt % RE-USY, 15 wt % boehmite alumina (CP 1.5®, ex Alcoa), 15 wt % aluminium chlorohydrol, 5 wt % of a sodium free silica sol, and 30 wt % kaolin was prepared by adding water to the holding vessel, followed by zeolite, boehmite, aluminium chlorohydrol, silica sol, and kaolin.

The slurry was fed to a pre-reactor with a volume of 1 liter with a residence time of 25 seconds. The slurry was homogenised in the pre-reactor by way of high-shear mixing using an EKATO-INTERMIG® impeller at 1,800 rpm. Spray-drying was performed with an inlet temperature of 400° C. and an outlet temperature of 120° C. The pH of the catalyst precursor mixture was 3.6; the temperature was 25° C.; and the viscosity was 5 Pa·s at a shear rate of $0.1\ s^{-1}$.

The viscosity was measured using a Physica® UDS rheometer with a cone-and-plate configuration. In this Comparative Example the mixture is not destabilized before spray-drying.

The catalyst was calcined to harden and remove the chlorides.

The Akzo Accessibility Index (AAI) of this comparative catalyst G was 5.8. The Attrition Index (AI) of this catalyst was 4.1; the Hot Attrition Index (HAT) was 8.2.

Example 4

Catalysts H–L were prepared in the same way as the comparative catalyst G of Comparative Example 3, the difference being that 1 minute before spray-drying the mixture was destabilized by the continuous addition (residence time: 25 seconds) of either a 10 wt % NaOH solution or a 10 wt % $NH_4OH$ solution to the pre-reactor. After destabilization the viscosity had increased to 75 Pa·s at a shear rate of $0.1\ s^{-1}$.

The pH of the mixtures after this destabilization is presented in Table 1, together with the resulting Akzo Accessibility Index (AAI) and the Hot Attrition Index (HAT).

TABLE 1

| Catalyst | Comparative catalyst G | H | I | J | K | L |
| --- | --- | --- | --- | --- | --- | --- |
| Acid/base | — | NaOH | NaOH | $NH_4OH$ | $NH_4OH$ | $NH_4OH$ |
| Final pH | 3.6 | 3.9 | 4.3 | 3.8 | 4.1 | 5.0 |
| AAI | 5.8 | 9.7 | 11.8 | 8.6 | 14.4 | 20.2 |
| HAT | 8.2 |  | 8.4 | 8.2 | 8.6 | 18.8 |
| AI | 4.1 | 7.5 | 12.7 | 6.1 | 17.2 | 25.7 |

These results again show that with the method according to the invention, catalysts with improved accessibility were obtained as compared to catalysts obtained under like conditions without destabilization, while maintaining good Hot Attrition values. The invention offers a way to prepare catalysts which possess very high accessibility and still reasonable strength.

Comparative Example 5

A catalyst precursor mixture with a total solids content of 25% comprising, on dry base, 30 wt % RE-USY, 6 wt % aluminium chlorohydrol, and 64 wt % kaolin was prepared by adding water to the holding vessel, followed by zeolite, aluminium chlorohydrol, and kaolin.

The slurry was fed to a pre-reactor with a volume of 1 liter with a residence time of 25 seconds. The slurry was homogenised in the pre-reactor by way of high-shear mixing using an EKATO-INTERMIG®) impeller at 1,800 rpm. Spray-drying was performed with an inlet temperature of 400° C. and an outlet temperature of 120° C. The pH of the catalyst precursor mixture was 4.0. The Akzo Accessibility Index (AAI) of this comparative catalyst M was 5.0.

FIG. 1 presents a Scanning Electron Microscopy (SEM) photograph of this catalyst, indicating the alumina-distribution in the catalyst particles in white. From this figure, it is clear that the particles of comparative catalyst M have a skin of alumina around the particles. Without being bound by theory, it is expected that the alumina skin is responsible for a diffusion barrier, leading to a relatively low accessibility of the catalyst pores.

Example 6

Catalysts N was prepared in the same way as comparative catalyst M of Comparative Example 5, the difference being that 1 minute before spray-drying the mixture was destabilized by the continuous addition (residence time: 25 seconds) of a 10 wt % solution of $NH_4OH$ to the pre-reactor. The pH of the resulting mixture was 5.0.

The Akzo Accessibility Index (AAI) of this catalyst N was 16.0.

FIG. 2 presents a Scanning Electron Microscopy (SEM) photograph of this catalyst, indicating the alumina-distribution in the catalyst particles in white. From this figure, it is clear that the particles of catalyst N, in contrast to the particles of comparative catalyst M (see FIG. 1), have no skin of alumina around the particles. This might explain the higher accessibility of catalyst N.

What is claimed is:

1. A process for preparing a catalyst which comprises combining catalyst components or precursors thereof in an aqueous medium to form a catalyst precursor mixture, feeding the mixture to a shaping apparatus, and shaping the mixture to form particles, said mixture being destabilized less than about 300 seconds before the shaping step.

2. The process of claim 1 wherein shaping is performed by spray-drying, extrusion, pelletizing or beading.

3. The process of claim 1 wherein the catalyst is an FCC catalyst.

4. The process of claim 3 wherein the shaping is performed by spray-drying.

5. The process of claim 1 wherein the catalyst precursor mixture comprises aluminium chlorohydrol or an aluminium chlorohydrol-containing composition.

6. The process of claim 5 wherein the aluminium chlorohydrol-containing composition has been produced by reacting aluminium trihydrate or its thermally treated form with HCl.

7. The process of claim 5 wherein destabilization is performed by decreasing the pH to below about 3.5 or increasing the pH to above about 4.5.

8. The process of claim 1 wherein the catalyst precursor mixture comprises a nitric acid based alumina sol.

9. The process of claim 8 wherein the nitric acid based alumina sol has been produced by reacting aluminium trihydrate or its thermally treated form with $HNO_3$.

10. The process of claim 1 wherein an acid or base stream is added to promote destabilization.

11. The process of claim 1 wherein the catalyst precursor mixture comprises water glass and/or a silica sol which may or may not be sodium-free.

12. The process of claim 11 wherein destabilization is performed by increasing the initial pH, which is in the range of about 1 to about 5, to a destabilization pH in the range of about 3–10.

13. The process of claim 12 wherein destabilization is performed by increasing the pH from about 2.5–3.5 to between about 4–6.

14. The process of claim 11 wherein the catalyst precursor mixture comprises peptised alumina.

15. The process of claim 11 wherein destabilization is performed by changing the temperature from about 15–35° C. to about 40–99° C.

16. The process of claim 1 wherein the catalyst precursor mixture comprises peptised alumina.

17. A process according to claim 16 wherein destabilization is performed by decreasing the initial pH, which is in the range of about 3 to 5, to a destabilization pH of about 4 or higher.

18. The process of claim 16 wherein destabilization is performed by changing the temperature from about 15–35° C. to about 40–99° C.

19. The process of claim 1 wherein destabilization is performed by changing the temperature from about 15–35° C. to about 40–99° C.

20. The process of claim 1 wherein said catalyst precursor mixture is destabilized by changing the pH by the addition of a pH regulating agent.

21. The process of claim 20 wherein the pH regulating agent is sodium hydroxide, ammonium hydroxide, nitric acid, sodium aluminate, magnesium oxide, sodium silicate, silica sol, sodium phosphate, ammonium phosphate and/or diammonium phosphate.

22. The process of claim 20 wherein the pH regulating agent is a phosphate treated zeolite and/or a mixture of phosphate and zeolite, anionic clay and/or doped anionic clay.

23. The process of claim 22 wherein the pH regulating agent is anionic clay or doped anionic clay, said anionic clay being stabilized by hydrothermal treatment or being prepared under hydrothermal conditions.

* * * * *